(12) United States Patent
Kudelko et al.

(10) Patent No.: US 7,616,102 B2
(45) Date of Patent: Nov. 10, 2009

(54) NON-OPAQUE EXTERNAL PARKING AID SENSOR BEZELS

(75) Inventors: Conrad M. Kudelko, Livonia, MI (US); Bob Kwiecinski, Saline, MI (US); Bob Harris, Dearborn, MI (US); Gerald F. Crawford, Chelsea, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 331 days.

(21) Appl. No.: 11/561,942

(22) Filed: Nov. 21, 2006

(65) Prior Publication Data

US 2008/0117080 A1    May 22, 2008

(51) Int. Cl.
 *B60Q 1/00* (2006.01)
(52) U.S. Cl. ............... 340/435; 340/436; 340/463; 340/932.2
(58) Field of Classification Search ............ 340/463, 340/468, 932.2
See application file for complete search history.

(56) References Cited

U.S. PATENT DOCUMENTS

| | | | |
|---|---|---|---|
| 6,203,366 | B1 | 3/2001 | Müller et al. |
| 6,282,969 | B1* | 9/2001 | Daniel ............... 73/866.1 |
| 6,615,121 | B2 | 9/2003 | Li |
| 6,693,520 | B2 | 2/2004 | Li |
| 6,879,250 | B2 | 4/2005 | Fayt et al. |
| 6,909,376 | B2 | 6/2005 | Rennick |
| 6,977,584 | B2* | 12/2005 | Milliken ............ 340/468 |
| 7,020,902 | B1 | 4/2006 | Tyler |
| 7,068,159 | B2 | 6/2006 | Ko |
| 7,084,744 | B2 | 8/2006 | Li |
| 2005/0165525 | A1* | 7/2005 | Li ............... 701/36 |
| 2008/0041299 | A1* | 2/2008 | Hoffman ............ 116/305 |
| 2008/0237925 | A1* | 10/2008 | VonHoltz et al. ........ 264/275 |

OTHER PUBLICATIONS

Website: "Parking Assist Systems" http://www.abrn.com/abm/content/printContentPopup.jsp?id=155341.
Website: "R.A.M Mobile" http://www.rammobile.com/accessories.htm.
Website: "Taurus T123P Parking Sensor—Car Audio Plus: UK In-Car Entertainment, Car CD Players, MP3 Players, Stereos" http://www.caraudioplus.co.uk/Parking_Sensors/Taurus_T123P_Parking_Sensor.
Website: "Ultrasonic Sensors, Ultrasonic Sensors manufacturer, Ultrasonic Sensors factories" http://xi-maoelectronics.hisupplier.com/product/3680/Ultrasonic-Sensors.html, Sep. 2006.

* cited by examiner

*Primary Examiner*—Davetta W Goins
*Assistant Examiner*—Samuel J Walk
(74) *Attorney, Agent, or Firm*—Gregory Brown; Price, Heneveld, Cooper, DeWitt & Litton, LLP

(57) ABSTRACT

An assembly for mounting a parking aid sensor to an automobile bumper. The assembly may include a sensor housing including an internal structure configured to secure the parking aid sensor and an external structure configured to secure the sensor housing in an opening in the automobile bumper. A fascia may be mounted to or integrated with the sensor housing and disposable against the automobile bumper. The fascia may be formed of a non-opaque material for enabling a color or background of the automobile bumper to be visible through the fascia to enable the assembly to be used with a plurality of automobile bumpers of different colors or backgrounds.

16 Claims, 7 Drawing Sheets

NON-OPAQUE EXTERNAL PARKING AID SENSOR BEZELS

BACKGROUND OF INVENTION a. Field of Invention

The invention relates generally to vehicle components for detection of objects for facilitating parking and other maneuvers, and more particularly, to bezels for facilitating attachment of parking aid sensors to areas such as the front and rear bumpers of a vehicle.

b. Description of Related Art

As is known in the art, parking aid sensors are attached to front and/or rear bumpers of automobiles for facilitating parking and maneuvering of a vehicle adjacent objects. Parking aid sensors generally use sonar technology, which in the near future may be utilized for image detection devices for pedestrian protection, collision avoidance, adaptive speed control, etc. Existing sonar based sensors must be mounted such that the sensor is exposed for proper operation. On the other hand, radar based sensors can be concealed behind a bumper cover. However due to the additional cost of radar based sensors, such sensors can be prohibitive from a cost perspective, and moreover, such sensors often also require sonar based sensors for adequate system function.

Referring to FIGS. 1A-1D, parking aid sensor assemblies 10 are generally mounted by means of a housing or bezel 12 disposed in a hole (not shown) in a bumper 14, with the bezel holding sensor 16 in place. In order to complement the colored bumper cover, valence panel and other adjacent body components, bezels are generally provided or finished in a body color, an accent or in a black color. Alternatively, as shown for sensor assemblies 18, 20 of FIGS. 1C and 1D, respectively, expensive techniques involving heat staking, adhesive bonding or sonic welding may be used for attachment of the sensors without the bezel designs of FIGS. 1A and 1B. In automobiles manufactured by the hundreds of thousands and often available in a variety of color combinations, such finish requirements for bezels and other such housing devices can unnecessarily add to the overall end-product cost. Since aesthetically bezels and other housing devices have little or no value other than holding a sensor in place, it is desirable to minimize the manufacturing, assembly and overall end-product cost for such components.

For example, U.S. Pat. No. 6,909,376 to Rennick discloses a light and proximity sensor assembly (22) including a shell (28), transducer (36) of proximity sensor assembly, and lens plate (40) for covering shell (28). As shown in FIG. 1, lens plate (40) is formed with a selectively transparent material so that when bulbs (30, 31) are illuminated, light of appropriate intensity is emitted through assembly (22), (Col. 3:11-49).

The sensor assembly of Rennick however does not address, much less recognize, the aforementioned problems associated with bumper mounted sensors, in that with shell (46) including transducer (36) mounted therein, shell (46) is mounted away from the painted area of the vehicle body. Thus, a single color and design for shell (46) may be utilized with any paint combination.

It is therefore desirable to provide a bumper or body mounted parking aid sensor bezel that is simple to manufacture and assemble, and provides an economical means of attaching a parking aid sensor without requiring the bezel to be uniquely manufactured based on a vehicle's body color. It is also desirable to provide a parking aid sensor bezel that may be modified or made of a variety of materials for matching or contrasting with a vehicle body color.

SUMMARY OF THE INVENTION

The invention solves the problems and overcomes the drawbacks and deficiencies of prior art parking aid sensor bezel and housing designs by providing an assembly for mounting a parking aid sensor to an automobile bumper. The assembly may include a sensor housing including an internal structure configured to secure the parking aid sensor and an external structure configured to secure the sensor housing in an opening in the automobile bumper. A fascia may be mounted to (or integrated with) the sensor housing and disposable against the automobile bumper. The fascia may be formed of a non-opaque material for enabling a color or background of the automobile bumper to be visible through the fascia to enable the assembly to be used with a plurality of automobile bumpers of different colors or backgrounds.

For the assembly described above, in a particular embodiment, the fascia may be formed of a transparent material for enabling the color or background of the automobile bumper to be visible through the fascia. Alternatively, the fascia may be formed of a tinted material for enabling a percentage of the color or background of the automobile bumper to be visible through the fascia. The fascia may also include graphics. In a particular embodiment, the fascia may be formed of a material capable of being illuminated, and/or the assembly may include a light source (i.e. a LED) for illuminating the fascia. The fascia may be formed of an ABS or PC/ABS polycarbonate material and/or a photo-luminescent material. The fascia may likewise be formed with the sensor housing also formed of a non-opaque material.

The invention further provides an assembly for mounting a parking aid sensor to an automobile structure. The assembly may include a sensor housing including an internal structure configured to secure the parking aid sensor and an external structure configured to secure the sensor housing in an opening in the automobile structure. A fascia may be mounted to (or integrated with) the sensor housing and disposable against the automobile structure. The fascia may be formed of a non-opaque material for enabling a color or background of the automobile structure to be visible through the fascia to enable the assembly to be used with a plurality of automobile structures of different colors or backgrounds.

For the assembly described above, in a particular embodiment, the fascia may be formed of a transparent material for enabling the color or background of the automobile structure to be visible through the fascia. Alternatively, the fascia may be formed of a tinted material for enabling a percentage of the color or background of the automobile structure to be visible through the fascia. The fascia may also include graphics. In a particular embodiment, the fascia may be formed of a material capable of being illuminated, and/or the assembly may include a light source (i.e. a LED) for illuminating the fascia. The fascia may be formed of an ABS or PC/ABS polycarbonate material and/or a photo-luminescent material. The fascia may likewise be formed with the sensor housing also formed of a non-opaque material.

The invention also provides an assembly for mounting a parking aid sensor to an automobile structure. The assembly may include a parking aid sensor rubstrip including at least two sensor housings mounted to or integrally formed with the parking aid sensor rubstrip. The sensor housings may include an internal structure configured to secure the parking aid sensor. One or more retention members may be mounted to or integrally formed with the parking aid sensor rubstrip for attachment of the parking aid sensor rubstrip to the automobile structure. The parking aid sensor rubstrip may be formed of a non-opaque material for enabling a color or background of the automobile structure to be visible through the parking aid sensor rubstrip to enable the assembly to be used with a plurality of automobile structures of different colors or backgrounds.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detail description serve to explain the principles of the invention. In the drawings.

DETAILED DESCRIPTION OF THE PREFERRED EMBODIMENTS

Figure 6:
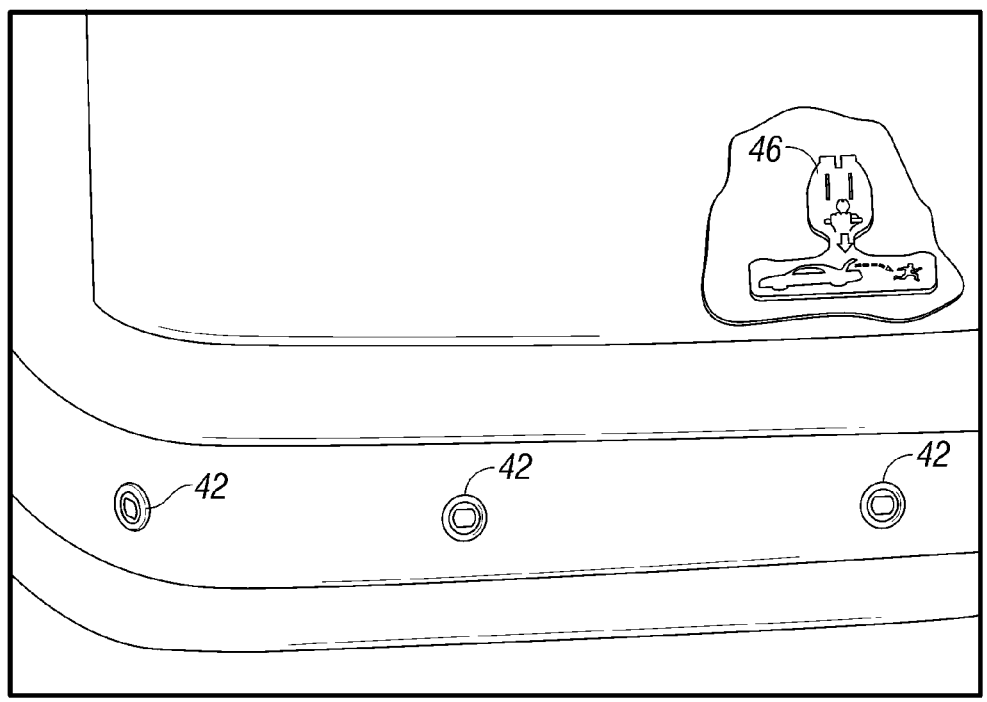
FIG. 6 is an illustrative view of fascias formed of photo-luminescent material, with the fascias and related components being illustrated in a "glowing" configuration.
Figure 7:
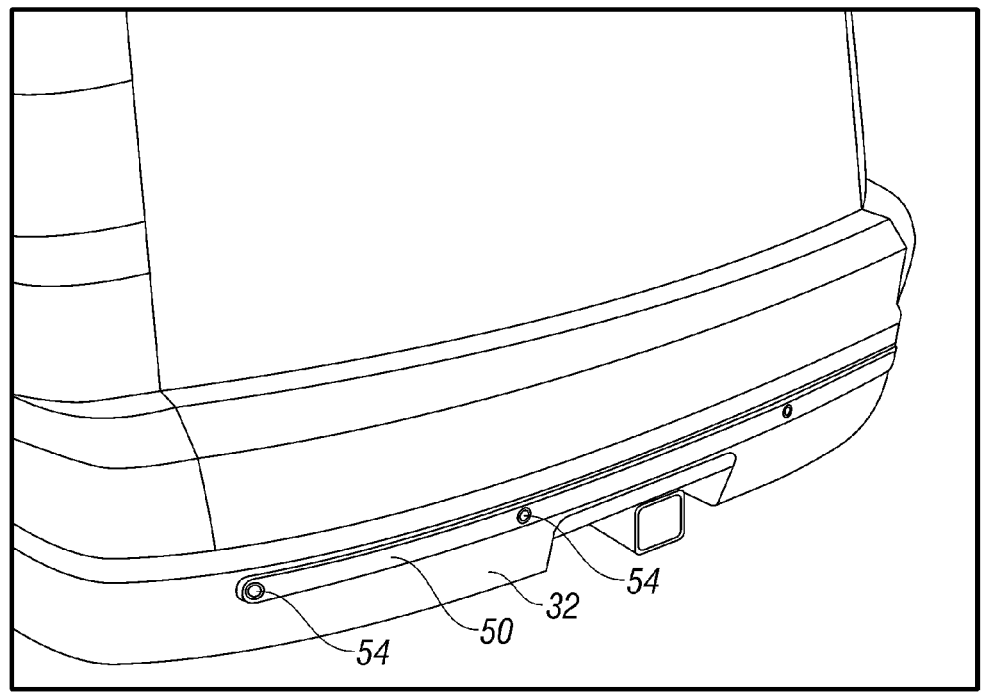
FIG. 7 is an illustrative view of an embodiment including an integrated parking aid sensor bumper rubstrip according to the present invention.
Figure 8:
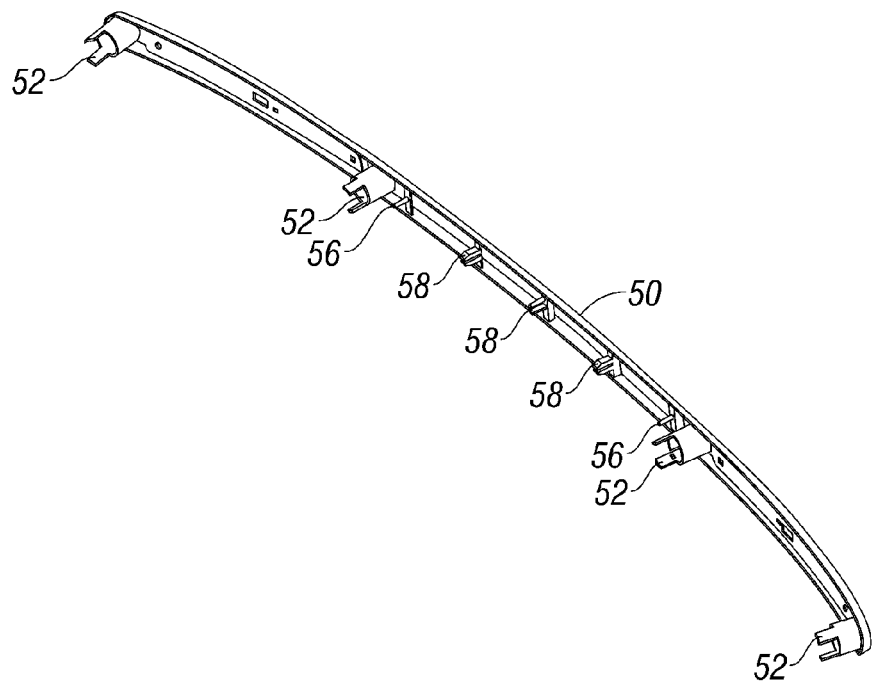
FIG. 8 is an illustrative isometric view of the parking aid sensor bumper rubstrip of FIG. 7.

Referring now to the drawings wherein like reference numerals designate corresponding parts throughout the several views, FIGS. 2A-6 illustrate various views of an assembly for mounting a parking aid sensor to an automobile bumper (hereinafter "parking aid sensor assembly") according to the present invention, and FIGS. 7 and 8 illustrate an embodiment including an integrated parking aid sensor bumper rubstrip according to the present invention.

Figure 1A:
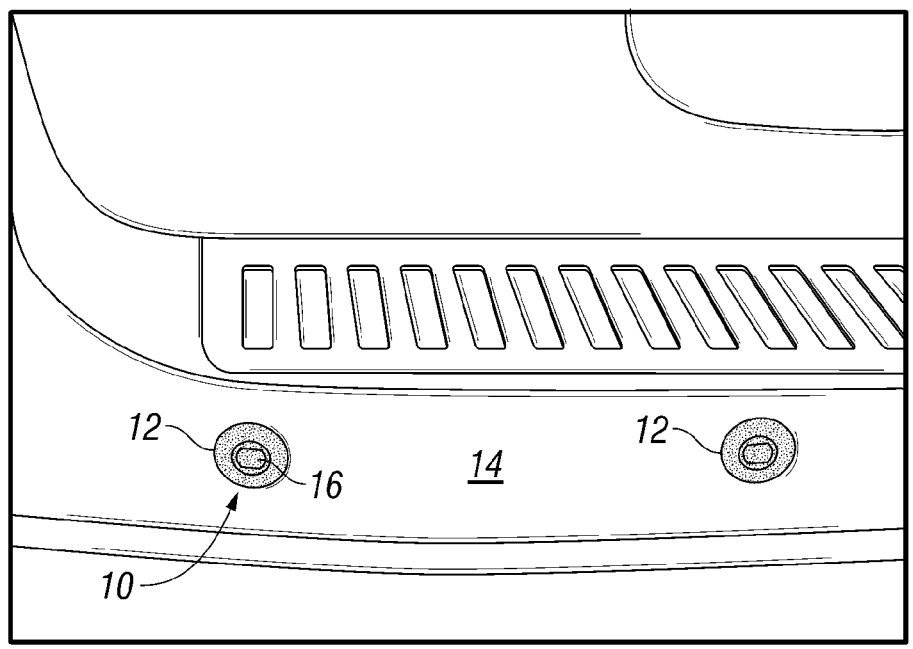
FIGS. 1A and 1B are exemplary views of related art parking aid sensor placement illustrating the exposed bezels provided in a black (FIG. 1A) and in a painted configuration (FIG. 1B) for matching the bumper painted surface.
Figure 1B:
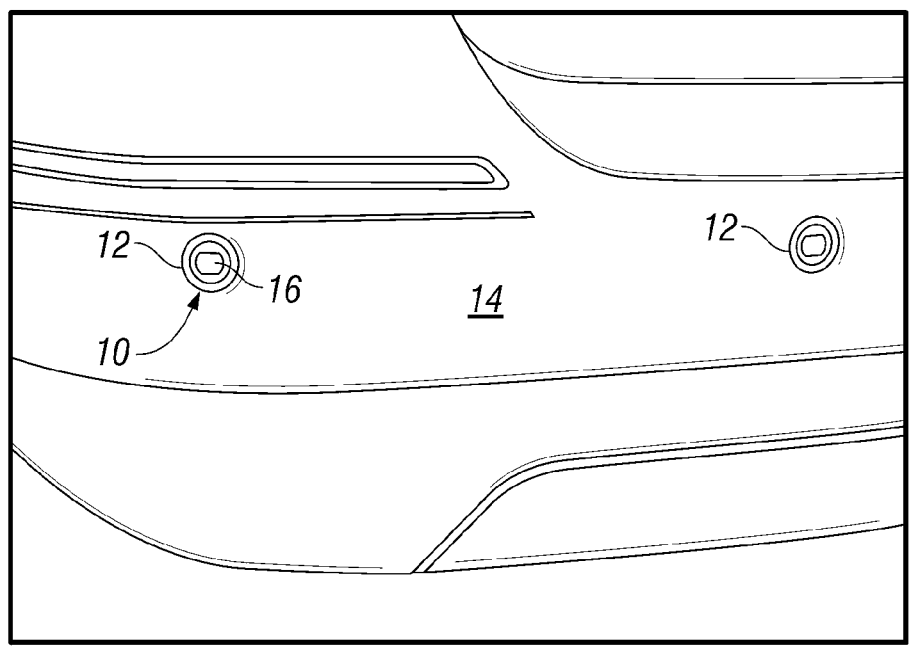
Figure 1C:
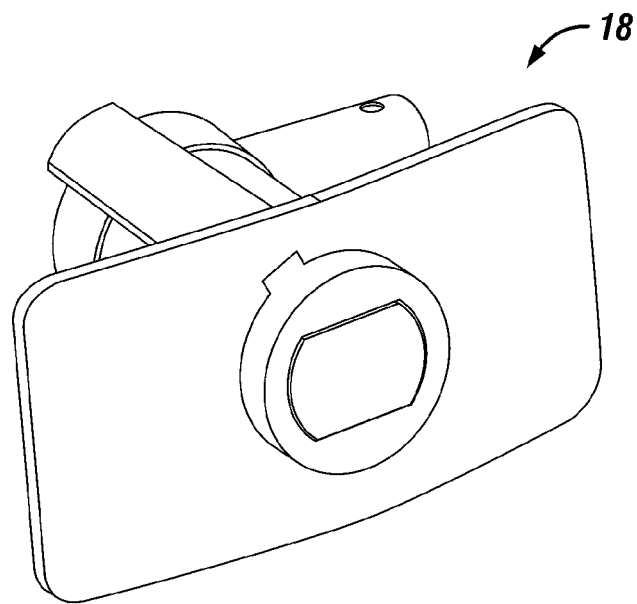
FIG. 1C illustrates a related art parking aid sensor design mountable by means of heat staking or adhesive bonding.
Figure 1D:
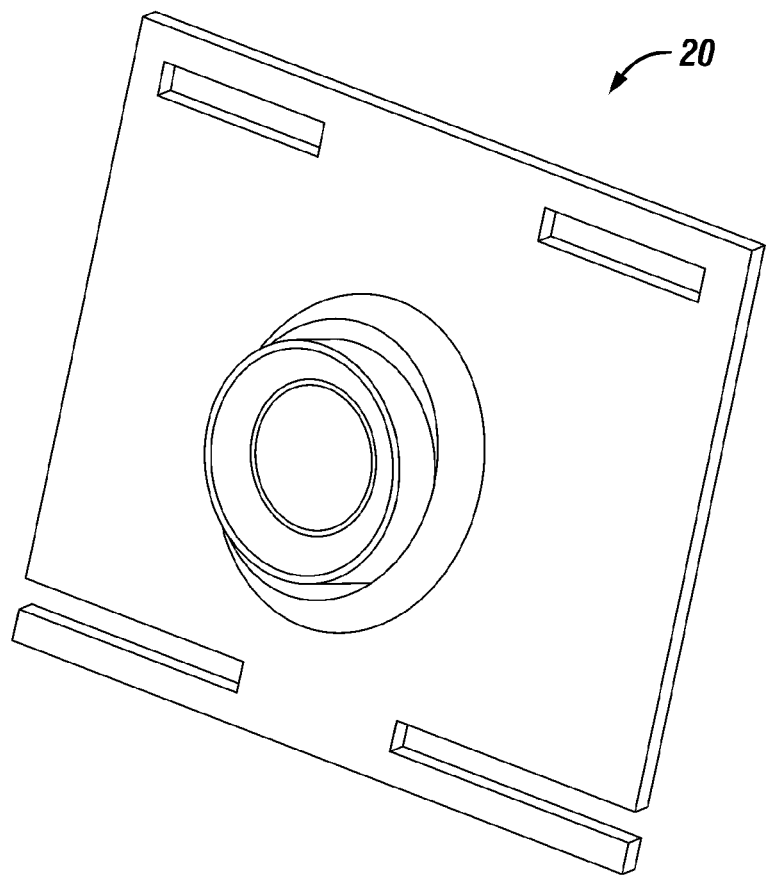
FIG. 1D illustrates a related art parking aid sensor design mountable by means of heat staking or sonic welding techniques.
Figure 2A:
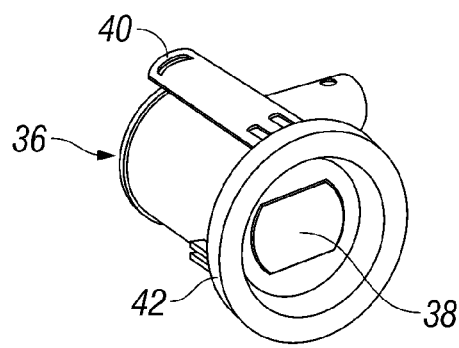
FIGS. 2A-2C are illustrative views of a parking aid sensor assembly according to the present invention, illustrating the sensor assembly housing in transparent (FIG. 2A), frosted (FIG. 2B) and translucent (FIG. 2C)
Figure 2B:
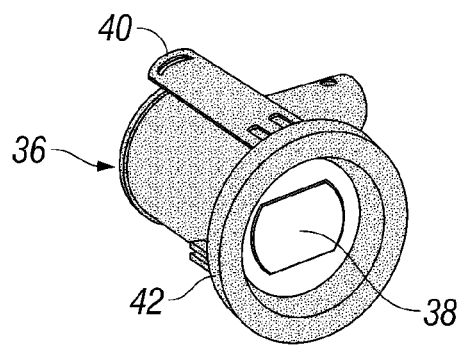
Figure 2C:
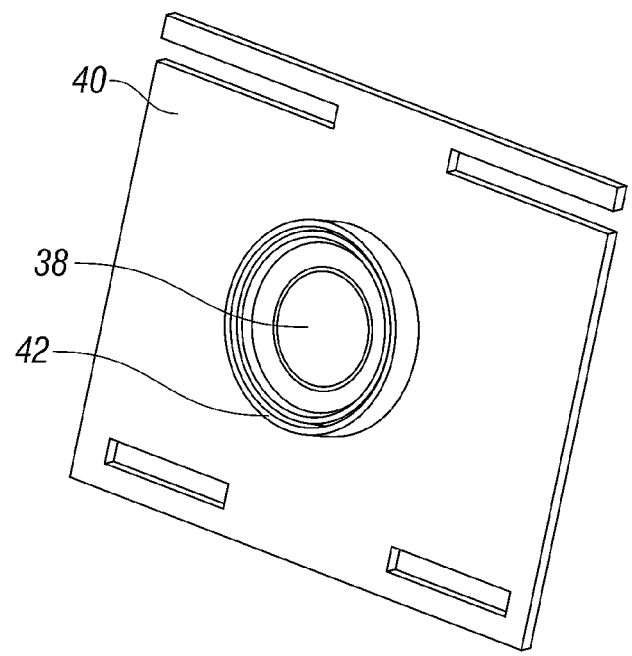
Figure 3:
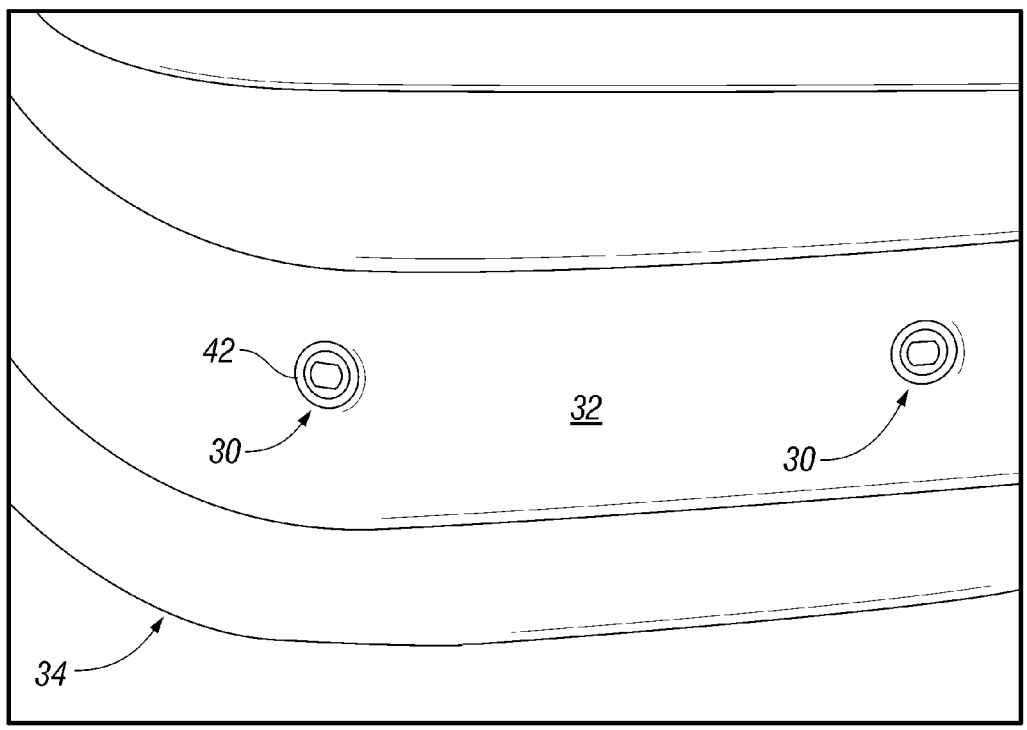
FIG. 3 is an illustrative view of the transparent parking aid sensor assembly of FIG. 2A shown on an automobile bumper.

Referring to FIGS. 2A-2C and FIG. 3, the present invention generally provides parking aid sensor assembly 30 mountable to an automobile bumper 32 and the like for facilitating parking and maneuvering of vehicle 34 adjacent objects (not shown). Alternatively, assembly 30 may be mounted to any necessary structure of vehicle 34, as would be readily apparent to those skilled in the art. Parking aid sensor assembly 30 may generally include a sensor housing 36 including a sonar-based sensor 38 mounted therein. As illustrated in FIGS. 2A-2C, sensor housing 36 may include an external structure 40 configured for retention in a complementary hole (not shown) in bumper 32. Likewise, as readily evident to those skilled in the art, sensor housing 36 may be configured internally for retention of an oval (see FIGS. 2A and 2B) or a circular (see FIG. 2C) sensor.

Referring again to FIGS. 2A-2C and FIG. 3, parking aid sensor assembly 30 may include an outer fascia 42 formed of a non-opaque material for facilitating use of assembly 30 with bumpers and other adjacent components having a variety of colors. In a particular embodiment of the present invention, parking aid sensor assembly 30 may be formed of an ABS and PC/ABS polycarbonate material, and be formed transparent as illustrated in FIG. 2A. In this manner, the transparent outer fascia 42 of parking aid sensor assembly 30 may allow the particular color of bumper 32 to be visible therethrough, for use of assembly 30 with a variety of vehicles regardless of their particular color scheme (i.e. a metallic or other background).

Alternatively, as illustrated in FIG. 2B, outer fascia 42 of parking aid sensor assembly 30 may include a frosted configuration or graphics such as fresnel optics if true see through is not required or desirable. As shown in FIG. 2C, fascia 42 may alternatively be tinted for use with a metallic color scheme (or another background) for providing a distinctive appearance for assembly 30.

Figure 4A:
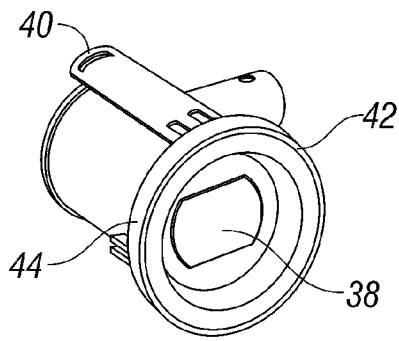
FIGS. 4A-4D are illustrative views of a parking aid sensor assembly according to the present invention, illustrating the sensor assembly housing in un-illuminated (FIG. 4A), illuminated (FIG. 4B), amber (FIG. 4C) and white (FIG. 4D) configurations.
Figure 4B:
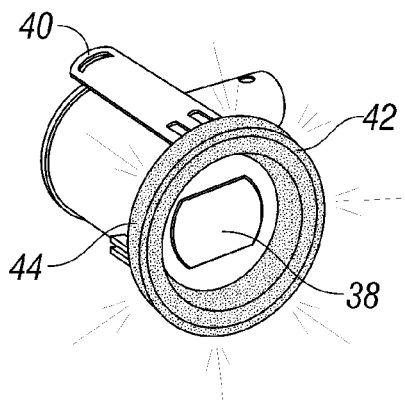

Referring next to FIGS. 4A, 4B, 5A and 5B, outer fascia 42 of parking aid sensor assembly 30 may include a LED 44 affixed adjacent or between fascia 42 and rear bumper 32 for illuminating fascia 42. For example, as shown in FIG. 4A, LED 44 may be illuminated to emit a white color to thus function as a backup lamp (or complement an existing backup lamp) in conjunction with a vehicle's standard backup lamp (not shown). Alternatively, as shown in FIG. 4B, LED 44 (or another LED) may be illuminated to emit a red color to thus function as a tail or stop lamp (or complement an existing tail or stop lamp). Alternatively, bumper 32 may be provided with a plurality of red/white fascias 42 disposed at predetermined locations and illuminated for providing the aforementioned backup, tail or stop lamp functions. LED's 44 may be configured to illuminate or flash when a vehicle comes to a stop for example for alerting nearby pedestrians or vehicles. Luminescence of fascias 42 thus provides an active (as opposed to passive) functionality when deployed for thus providing yet an additional operational benefit for assemblies 30.

Figure 4C:
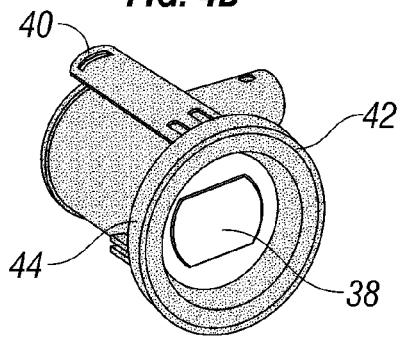
Figure 4D:
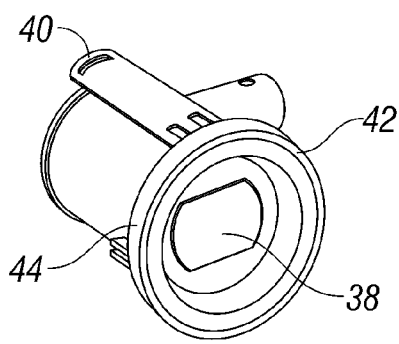
Figure 5A:
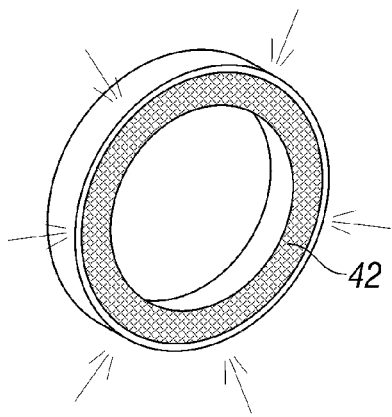
FIGS. 5A and 5B are illustrative views of the parking aid sensor assembly of FIGS. 4A-4D, illustrating the assemblies of FIGS. 4B and 4C in an illuminated configuration.
Figure 5B:
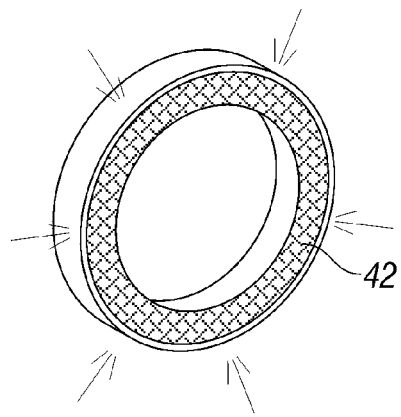

Referring to FIGS. 4C and 4D, in a similar manner as FIGS. 4A and 4B, outer fascia 42 of parking aid sensor assembly 30 may include an amber (FIG. 4C) or white (FIG. 4D) surface for providing an alternative distinctive appearance. For example, fascias 42 may include a vehicle or brand specific color or graphic pattern thereon.

Referring next to FIG. 6, outer fascia 42 of parking aid sensor assembly 30 may alternatively be formed of a photo-luminescent material for providing a "glowing" effect in dark conditions. In the embodiment of FIG. 6, a plurality of assemblies 30 may be disposed on bumper 32, in a similar manner as a photo-luminescent indicator 46 provided at a central location for opening of a trunk lid (for example) from inside the trunk. In this manner, fascias 42 may "glow" and thus provide a distinctive appearance for parking aid sensor assemblies 30. Further, the luminescence of fascias 42 of the FIG. 6 assemblies also provides a safety feature by warning pedestrians and/or other vehicles if a vehicle having assemblies 30 mounted thereon is parked or disabled. As with the assemblies of FIGS. 4A-5B, luminescence of fascias 42 of the FIG. 6 assemblies thus provides an active (as opposed to passive) functionality when deployed for thus providing yet an additional operational benefit for assemblies 30. The assemblies of FIGS. 5A and 5B may be mounted to housing 36 by means of adhesive, snap fit, interference fit, linear welding, heat staking, sonic welding, laser welding, vibration welding, mechanical attachments, or other conventional joining techniques.

Parking aid sensor assemblies 30 described above thus provide a variety of benefits, including matching of fascia 42 with a variety of vehicle color combinations (see transparent assembly of FIG. 2A), accent (see frosted assembly of FIG. 2B), or contrasting color appearance (see tinted assembly of FIG. 2C). Fascia 42 may also include optical graphics (i.e. fresnel, smoked glass, amber, marble, carbon fiber, faceted, etc.) for providing a distinctive appearance. Yet further, fascia 42 may include perimeters including a saw tooth, polygonal, symmetrical designs, etc., dimpling, smooth, textured or untextured surfaces.

Those skilled in the art would readily appreciate in view of this disclosure that various modifications could be made to the parking aid sensor assembly 30 described above, without departing from the scope of the present invention. For example, instead of LEDs, fascias 42 may be illuminated by means of carbon fiber optics, colored/non-colored lamps, photo phosphorescence, luminescence, phosphorescence, iridescence, etc. The illuminated fascias 42 may serve (or complement) a variety of functions including, for example, parking, fog, backup, reflex (i.e. for fascia 42 made of a reflective material), brake and tail lamp signals. Alternatively, other light sources (i.e. tail lamps) may be used for illuminating fascias 42.

The present invention thus provides for significant reduction in costs associated with design, manufacturing and installation of parking aid sensor assemblies 30. For example, for an automobile available in 10-12 unique colors, the present invention provides for a ten-fold or greater reduction in the number of unique designs required for parking aid sensor assemblies 30. The reduction in the number of assembly designs also provides benefits in reduction of potential errors or defects in an overall parking aid sensory assembly. Assemblies 30 may also be recycled as needed, and thus provide further reduction in costs associated with manufacture of new assemblies, as well as reduction in costs associated with paint stripping/matching for pre-painted assemblies.

Referring next to FIGS. 7 and 8, the present invention provides another embodiment of parking aid sensor assembly 30 including an integrated parking aid sensor bumper rubstrip 50. As shown in FIG. 8 and discussed above for FIGS. 2A-2C and FIG. 3, parking aid sensor bumper rubstrip 50 may generally include a plurality of integrated (molded) sensor housing members 52 (similar to sensor housing 36) for holding sensors 54 (similar to sensors 38) therein. Parking aid sensor bumper rubstrip 50 may include a plurality of integrated posts 56 for facilitating alignment and retention of the rubstrip to bumper 32 having corresponding holes (not shown) therein, with the posts being retained with bumper 32 by a plurality of push washers, for example. Parking aid sensor bumper rubstrip 50 may also include a plurality of snap-fit members 58 integrated (molded) into the rubstrip for engaging corresponding openings (not shown) in bumper 32.

As discussed above for sensor housing 36 and fascia 42, parking aid sensor bumper rubstrip 50 may be formed clear, translucent or transparent (or with a pattern) for displaying the color or background of the automobile bumper through the rubstrip. Since rubstrip 50 is a separate piece from bumper 32, the rubstrip may be tailored to the different angles predicated by the parking aid sensors (for function) without affecting the overall bumper styling. As readily evident, parking aid sensor bumper rubstrip 50 may be mounted to the front, rear (as shown) or any other side of an automobile.

Although particular embodiments of the invention have been described in detail herein with reference to the accompanying drawings, it is to be understood that the invention is not limited to those particular embodiments, and that various changes and modifications may be effected therein by one skilled in the art without departing from the scope or spirit of the invention as defined in the appended claims.

What is claimed is:

1. An assembly for mounting a parking aid sensor to an automobile bumper, said assembly comprising:
   a sensor housing including an internal structure configured to secure the parking aid sensor and an external structure configured to secure said sensor housing in an opening in the automobile bumper; and
   a fascia mounted to said sensor housing and disposable against an exterior portion of the automobile bumper, wherein said fascia is formed of a non-opaque material for enabling a color or background of the automobile bumper to be visible through said fascia to enable said assembly to be used with a plurality of automobile bumpers of different colors or backgrounds.

2. An assembly according to claim 1, wherein said fascia is formed of a transparent material for enabling the color or background of the automobile bumper to be visible through said fascia.

3. An assembly according to claim 1, wherein said fascia is formed of a material capable of being illuminated.

4. An assembly according to claim 1, further comprising a light source located at an outer portion of said facia for illuminating said fascia.

5. An assembly according to claim 1, further comprising a LED located at an outer portion of said facia for illuminating said fascia.

6. An assembly according to claim 1, wherein said fascia is formed of an ABS or PC/ABS polycarbonate material.

7. An assembly according to claim 1, wherein said fascia is formed with said sensor housing formed of a non-opaque material.

8. An assembly according to claim 1, wherein said fascia is formed of a photo-luminescent material.

9. An assembly for mounting a parking aid sensor to an automobile structure, said assembly comprising:
   a sensor housing including an internal structure configured to secure the parking aid sensor and an external structure configured to secure said sensor housing in an opening in the automobile structure; and
   a fascia mounted to said sensor housing and disposable against an exterior portion of the automobile structure, wherein said fascia is formed of a non-opaque material for enabling a color or background of the automobile structure to be visible through said fascia to enable said assembly to be used with a plurality of automobile structures of different colors or backgrounds.

10. An assembly according to claim 9, wherein said fascia is formed of a transparent material for enabling the color or background of the automobile structure to be visible through said fascia.

11. An assembly according to claim 9, wherein said fascia is formed of a material capable of being illuminated.

12. An assembly according to claim 9, further comprising a LED for illuminating said fascia.

13. An assembly according to claim 9, wherein said fascia is formed of an ABS or PC/ABS polycarbonate material.

14. An assembly according to claim 9, wherein said fascia is formed with said sensor housing formed of a non-opaque material.

15. An assembly according to claim 9, wherein said fascia is formed of a photo-luminescent material.

16. An assembly for mounting a parking aid sensor to an automobile structure, said assembly comprising:

a parking aid sensor rubstrip including at least two sensor housings mounted to or integrally formed with said parking aid sensor rubstrip, said sensor housings including an internal structure configured to secure the parking aid sensor; and at least one retention member mounted to or integrally formed with said parking aid sensor rubstrip for attachment of said parking aid sensor rubstrip to an exterior portion of the automobile structure, wherein said parking aid sensor rubstrip is formed of a non-opaque material for enabling a color or background of the automobile structure to be visible through said parking aid sensor rubstrip to enable said assembly to be used with a plurality of automobile structures of different colors or backgrounds.

* * * * *